United States Patent
Ott

(10) Patent No.: US 11,311,872 B2
(45) Date of Patent: Apr. 26, 2022

(54) PIPETTING DEVICE COMPRISING A FLUID VOLUME SENSOR AND FLUID PROCESSING SYSTEM

(71) Applicant: TECAN TRADING AG, Mannedorf (CH)

(72) Inventor: Philipp Ott, Steg im Tosstal (CH)

(73) Assignee: TECAN TRADING AG, Mannedorf (CH)

( * ) Notice: Subject to any disclaimer, the term of this patent is extended or adjusted under 35 U.S.C. 154(b) by 604 days.

(21) Appl. No.: 16/309,058

(22) PCT Filed: Jul. 19, 2017

(86) PCT No.: PCT/EP2017/068203
§ 371 (c)(1),
(2) Date: Dec. 11, 2018

(87) PCT Pub. No.: WO2018/015421
PCT Pub. Date: Jan. 25, 2018

(65) Prior Publication Data
US 2021/0220815 A1    Jul. 22, 2021

(30) Foreign Application Priority Data
Jul. 22, 2016  (CH) ......................................... 950/16

(51) Int. Cl.
*B01L 3/02*       (2006.01)
*G01F 23/263*  (2022.01)
(Continued)

(52) U.S. Cl.
CPC ............. *B01L 3/0275* (2013.01); *B01L 3/021* (2013.01); *B01L 3/54* (2013.01); *B01L 9/54* (2013.01);
(Continued)

(58) Field of Classification Search
CPC .......... B01L 3/0275; B01L 3/021; B01L 9/54; B01L 3/54; B01L 2400/0487;
(Continued)

(56) References Cited

U.S. PATENT DOCUMENTS

| 5,315,872 A | 5/1994 | Moser |
| 6,551,558 B1 * | 4/2003 | Mann ...................... G01F 23/24 |
| | | 116/109 |

(Continued)

FOREIGN PATENT DOCUMENTS

| EP | 2840366 A1 | 2/2015 |
| JP | 2005283150 A | 10/2005 |

OTHER PUBLICATIONS

International Search Report for corresponding PCT application No. PCT/EP2017/068203, dated Oct. 10, 2017.
(Continued)

*Primary Examiner* — Jennifer Wecker
*Assistant Examiner* — Oyeleye Alexander Alabi
(74) *Attorney, Agent, or Firm* — Notaro, Michalos & Zaccaria P.C.

(57) ABSTRACT

The invention relates to a pipetting device having tube with an opening at one end for suctioning or discharging a sample fluid, and can be operatively connected to a pressure generation device at the other end. A first electrode is formed on the pipetting device that forms a measuring capacitor together with a second electrode formed by at least one part of the sample fluid and that can be received in the tube and the measuring capacitor is operatively connected to a measuring unit, and the measuring unit is designed to determine a volume of the suctioned or discharged sample fluid according to the capacity of the measuring capacitor. The invention also relates to a fluid processing system having a pipetting device of this type, as well as a method for determining a
(Continued)

processed fluid volume during pipetting with a pipetting device of this type.

17 Claims, 6 Drawing Sheets

(51) Int. Cl.

| | | |
|---|---|---|
| *G01N 35/10* | (2006.01) | |
| *B01L 3/00* | (2006.01) | |
| *G01D 5/241* | (2006.01) | |
| *G01N 35/00* | (2006.01) | |
| *B01L 9/00* | (2006.01) | |
| *G01F 22/00* | (2006.01) | |
| *B25J 9/16* | (2006.01) | |

(52) U.S. Cl.
CPC ............ *B01L 9/543* (2013.01); *B25J 9/1664* (2013.01); *G01D 5/2417* (2013.01); *G01F 22/00* (2013.01); *G01F 23/263* (2013.01); *G01N 35/0099* (2013.01); *G01N 35/00584* (2013.01); *G01N 35/00732* (2013.01); *G01N 35/1011* (2013.01); *G01N 35/1016* (2013.01); *B01L 2200/0605* (2013.01); *B01L 2200/143* (2013.01); *B01L 2300/021* (2013.01); *B01L 2300/0645* (2013.01); *B01L 2400/049* (2013.01); *B01L 2400/0487* (2013.01); *G01N 2035/00811* (2013.01); *G01N 2035/103* (2013.01); *G01N 2035/1013* (2013.01); *G01N 2035/1025* (2013.01); *G01N 2035/1034* (2013.01)

(58) Field of Classification Search
CPC ....... B01L 2400/049; B01L 2200/0605; B01L 2300/0645; G01F 22/00; G01F 23/263; G01N 35/00584; G01N 35/00732; G01N 35/1011; G01N 35/0099; G01N 35/1016; G01N 2035/00811; G01N 2035/1025; G01N 2035/103; G01N 2035/1034; B25J 9/1664

See application file for complete search history.

(56) References Cited

U.S. PATENT DOCUMENTS

| | | | |
|---|---|---|---|
| 2005/0279855 A1* | 12/2005 | Baker | ................ G01N 35/1016 239/71 |
| 2013/0205893 A1 | 8/2013 | Shearer | |
| 2014/0005078 A1* | 1/2014 | Howell | .............. G01N 21/6452 506/39 |

OTHER PUBLICATIONS

International Preliminary Report on Patentability and Written Opinion for corresponding PCT application No. PCT/EP2017/068203, dated Jan. 22, 2019.

* cited by examiner

PIPETTING DEVICE COMPRISING A FLUID VOLUME SENSOR AND FLUID PROCESSING SYSTEM

TECHNICAL FIELD OF THE INVENTION

The present invention relates to the technical field of liquid processing systems and relates in particular to pipetting devices for aspirating (or receiving) and dispensing (or supplying) liquid volumes, for example, liquid samples, for automated laboratory devices or laboratory systems. Furthermore, a method for determining a liquid volume processed (i.e., aspirated or dispensed) during a pipetting procedure is proposed and uses of this method are specified.

BACKGROUND OF THE INVENTION

When large quantities of samples have to be examined in medical, chemical, analytical or pharmaceutical laboratories, automated laboratory systems or installations are usually used today to enable rapid and reliable processing of each individual sample. Such laboratory systems are often designed as liquid processing systems for handling liquid volumes, and are suitable for performing certain operations with these samples, such as optical measurements, pipetting, washing, centrifuging, incubating, and filtering. In this case, one or more robot (arms) are typically used for the fully automatic operation of such laboratory systems. These robots are specialized in particular in dealing with liquid containers, for example, sample tubes or microplates, in which the liquid samples are located. Such liquid processing systems comprise in particular pipettors both for aspirating and dispensing liquids or dispensers for dispensing liquids.

Most laboratory applications require very precise pipetting operations to obtain a satisfactory analytical accuracy. An accurate knowledge of the processed sample quantities or liquid volumes is thus of decisive significance. In previously known systems, this was usually determined indirectly, for example, by receiving the sample using a known aspirating power during a specific time. The problem with this indirect method of volume determination is that it cannot be ensured that the desired sample quantity was actually received (or dispensed, respectively), since, for example air is (partially) aspirated instead of the sample liquid or no liquid at all is received, because the pipette tip is clogged.

The effective received volume is also dependent on the viscosity and the surface tension of the sample. Further parameters, for example, variations in the diameter of the opening of disposable pipette tips, also influence the effective received sample volume.

Known methods of capacitive liquid level detection (cLLD) can be used for the purpose of determining the level height difference between the immersion into and the withdrawal from a sample liquid. The received or dispensed volume can be computed from the level height difference and the cross-sectional area of the vessel. However, these methods are excessively inaccurate for small volumes and large cross-sectional areas. They are therefore only suitable for large volumes. In addition, mechanical tolerances of the height infeed of the capacitive sensors corrupt the measurement of the level height difference.

Furthermore, there are also methods which monitor the pressure or the flow rate of an operating fluid (liquid or gas, usually air) during the aspirating or dispensing. However, these are very complex methods and moreover measurement can only be performed dynamically, i.e., the processed sample volume is ascertained from the pressure curve or a curve of the flow rate, respectively.

The need therefore exists for means which enable a simple (and therefore cost-effective) and also precise determination of the processed sample quantities or liquid volumes in automated liquid processing systems and thus ensure a high analytical accuracy of the examinations or operations which are carried out.

SUMMARY OF THE INVENTION

It is an object of the present invention to provide a pipetting device, with the aid of which a precise determination of the processed sample quantities or liquid volumes is enabled. This object is achieved according to the invention by the pipetting device defined in claim 1.

It is moreover an object of the present invention to equip a liquid processing system with the proposed pipetting device, to provide an apparatus suitable for laboratory systems or facilities. This object is achieved according to the invention by the liquid processing system according to claim 11.

It is a further object of the present invention to provide a method which enables an accurate determination of a processed (i.e., aspirated or dispensed) liquid volume during the pipetting.

It is furthermore an object of the present invention to specify uses of the proposed method. Such uses according to the invention are set forth in claims 16 and 17.

Specific embodiments according to the invention are specified in the dependent claims.

A pipetting device according to the invention comprises a tube, which has at one end an opening for aspirating or dispensing a sample liquid (also called a pipetting opening hereafter), and which is operationally connectable at the other end to a pressure generating means, for example, a pressure reservoir, a pump, a piston, or a plunger, wherein a first electrode is formed on the pipetting device which, together with a second electrode which is formed by at least a part of the sample liquid receivable in the tube, forms a measuring capacitor, which is operationally connected to a measuring unit, which is designed to determine a volume of the aspirated or dispensed sample liquid as a function of the capacitance of the measuring capacitor.

The core concept of the present invention is accordingly to use the sample liquid as one of the two electrodes of a measuring capacitor, i.e., the sample liquid acts as a "liquid electrode". Depending on the quantity of the sample liquid aspirated or dispensed, respectively, by the pipetting device, the capacitance of this measuring capacitor changes (i.e., it becomes greater or less, respectively), whereby the volume of the aspirated or dispensed sample liquid, respectively, can be accurately determined directly by means of the measuring unit. For this purpose, however, the sample liquid has to have a certain conductivity. In this case, the tube acts as a dielectric material between the two electrodes. Even very small volumes can be determined with high accuracy by way of a corresponding design of the tube, in the interior of which the sample electrode is located as the second electrode, and, for example, on the outer surface of which the first electrode is applied. The two electrodes of the measuring capacitor can have an arbitrary shape in this case. The precise relationship between the capacitance of the measuring capacitor as a function of the sample volume merely has to be ascertained beforehand.

The term sample volume is understood not only as the volume of liquid analysis samples, but rather also volumes of reagents, dilution solutions such as buffer solutions, solvents, or also suspensions having particles or cells.

A capacitance-to-digital converter (CDC) can be used in the measuring unit, for example. A CDC is a converter which converts capacitances into voltages and is based on the method of the sigma-delta converter. In the CDC method, for an unknown capacitance, its magnitude is determined in farads as a digital value. Examples of commercially available CDC modules are the FDC10004 from Texas Instruments and the AD7745 from Analog Devices.

In one embodiment, the pipetting device comprises the pressure generating means, for example, a pump, a piston, or a plunger.

In a further embodiment, the pipetting device comprises a pressure reservoir as a pressure generating means, which is fluidically connected via a valve to the tube.

In a further embodiment, the pipetting device comprises an overpressure reservoir and a partial vacuum reservoir as pressure generating means, which are each fluidically connected to the tube via valves.

In a further embodiment, the pipetting device has an electrical contact, which is electrically insulated from the first electrode and is designed such that during the aspirating or dispensing of the sample liquid, an electrical connection can be established to the sample liquid, so that at least a part of the sample liquid which is located in the tube forms the second electrode of the measuring capacitor, wherein the first electrode and the electrical contact for the second electrode are electrically connected to the measuring unit.

In a further embodiment of the pipetting device, the end having the opening for aspirating or dispensing the sample liquid is embodied as a pipette tip, wherein it is integrally formed with the tube or is detachably connected or connectable to the tube, and wherein the pipette tip is in particular tapered toward the opening or has a conical shape. The pipette tip can be, for example, a steel needle or cannula, which is suitable for repeated use, or it can be embodied as a disposable tip, which is only conceived for one-time use, and can consist, for example, of plastic.

In a further embodiment of the pipetting device, the first electrode partially or completely envelops the tube, in particular the pipette tip.

In a further embodiment of the pipetting device, the first electrode is formed by a wire, which is arranged along the tube in the longitudinal direction, in particular in the region of the opening or the pipette tip.

In a further embodiment of the pipetting device, the pipette tip consists of a nonconductive material, which is used as the dielectric material of the measuring capacitor.

In a further embodiment of the pipetting device, the pipette tip consists of a conductive material and forms the electrical contact.

In a further embodiment of the pipetting device, the electrical contact is located at the opening of the pipette tip.

In a further embodiment of the pipetting device, the electrical contact can be established via a capacitive coupling via the sample liquid, which is located in a sample container, from which sample liquid is aspirated or into which sample liquid is dispensed.

In a further embodiment of the pipetting device, the electrical contact is located on a channel wall of the tube, in particular it is formed by the channel wall, wherein the channel wall is at least partially coated using an electrically conductive material or consists of an electrically conductive material.

In a further embodiment of the pipetting device, the first electrode is covered using an insulation, in particular an electrically insulating layer.

According to a further aspect of the present invention, a liquid processing system comprises a proposed pipetting device having a pressure generating means, for example, a pressure reservoir, a pump, a piston, or a plunger, wherein the pressure generating means is connected to a controller, which is designed to generate a pressure for the aspirating or dispensing of the sample liquid in a closed control loop based on the volume determined using the measuring unit of the aspirated or dispensed sample liquid and a predefined target volume of the aspirated or dispensed sample liquid.

In one embodiment, the liquid processing system comprises a pressure reservoir as the pressure generating means, wherein the pressure reservoir is fluidically connected via a valve to the tube, and the valve is connected to the controller.

In one embodiment, the liquid processing system furthermore comprises a worktable for the arrangement of liquid containers, for example, sample tubes or microplates.

In one embodiment, the liquid processing system furthermore comprises a motorized transportation unit, for example, a robot arm, on which the pipetting device is arranged, wherein the controller is additionally designed for the purpose of transmitting signals to the transportation unit, in order to move the pipetting device such that the opening of the pipette tip is positionable accurately, in particular in a liquid container filled with the sample liquid, for example, a sample tube or a microplate.

In a further embodiment, the liquid processing system comprises a fluid chamber, which extends from the pressure generating means down into the tube and is filled with a system liquid or operating liquid, which is at the reference potential, in particular is connected to ground. The system liquid or operating liquid is used for pressure transmission from the pressure generating means into the tube ("liquid placement pipetting"—in contrast to air cushion pipetting "air displacement pipetting").

In a further embodiment of the liquid processing system, the first electrode is at a reference potential, in particular it is connected to ground. In this embodiment, a system liquid or operating liquid is also used for the pressure transmission.

In a further embodiment of the liquid processing system, the second electrode is at a reference potential, in particular the second electrode is capacitively coupled to ground, for example, via the sample liquid, which is located in a sample container from which sample liquid is aspirated or into which sample liquid is dispensed.

According to a further aspect of the present invention, a method for determining a processed liquid volume during pipetting using a proposed pipetting device comprises the following steps:

determining a first volume of the sample liquid, which is located in the pipetting device, as a function of the capacitance of the capacitor comprising the first and second electrode, wherein the second electrode is formed by a part of the sample liquid which is located in the pipette tip and/or the tube, wherein this first volume can be zero;

aspirating or dispensing sample liquid by generating a partial vacuum or overpressure, respectively, in the tube;

determining a second volume of the sample liquid, which is located at a second point in time in the pipetting device, as a function of the capacitance of the capacitor comprising the first and second electrode, wherein the second electrode is formed by a part of the sample liquid which is located at the second point in time in the pipette tip and/or the tube, wherein the second volume can be zero;

determining the liquid volume processed between the first and the second point in time, i.e., the aspirated or dispensed volume of the sample liquid, as the difference between the first and the second volume.

According to a further aspect of the present invention, the use of the proposed method for determining at least one of the following substantive matters based on a time curve in dependence on the determined capacitance and a time curve of the generated pressure is provided:

whether the opening of the tube and/or the pipette tip is at least partially clogged;

whether the sample liquid contains gas bubbles, in particular air bubbles, in particular whether the aspirated or dispensed sample liquid is foamy;

whether air was at least partially aspirated instead of sample liquid.

Furthermore, the use of the proposed method for ascertaining as a function of the determined capacitance whether an intact air gap exists between a system liquid or operating liquid in the sample liquid in the tube is provided according to the invention.

BRIEF DESCRIPTION OF THE DRAWINGS

Nonlimiting examples of embodiments of the present invention are explained in more detail below by reference to the figures. In the figures.

In the figures, identical reference numerals stand for identical elements.

DETAILED DESCRIPTION OF THE INVENTION

Figure 1:
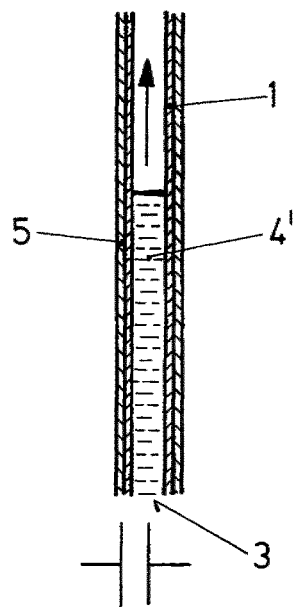
FIG. 1 shows a schematic illustration of an exemplary embodiment of a pipetting device according to the invention.

FIG. 1 shows a very simplified schematic illustration of an exemplary embodiment of a pipetting device according to the invention, to explain the core concept of the present invention. The pipetting device consists of a tube 1, which consists of glass or a plastic, for example. A sample liquid 4' from a sample container is aspirated into the tube 1 or dispensed therefrom in the channel of this tube 1 through an opening 3 at one end of the tube 1, for example, by the pressure in the tube 1 being reduced or increased, respectively, by means of a pump, a piston, or a plunger, which is fluidically connected to the other end of the tube 1. A first electrode 5 is arranged around the tube 1 to flatly envelop it entirely or partially. This first electrode 5 can consist, for example, of a copper layer vapor deposited onto the tube 1 or a copper foil adhesively bonded on the tube 1. This first electrode 5 is set to a specific reference potential, for example, connected to ground. If the sample liquid 4' is set to another potential via an electrical contact by means of a voltage source, the first electrode 5 and the sample liquid 4' as the counter electrode (=second electrode) thus together form a (measuring) capacitor, which has a capacitance of different magnitude depending on the volume of the sample liquid 4' presently located in the tube 1. A direct relationship thus exists between the capacitance of this measuring capacitor and the volume of the sample liquid 4' which is located in the tube 1, i.e., the capacitance increases upon aspirating of sample liquid and the capacitance decreases upon dispensing of sample liquid. By determining the capacitance of the measuring capacitor by means of a suitable measuring unit, which comprises, for example, a capacitance-to-digital converter (so-called CDC), the volume of the sample liquid 4' located in the tube 1 can thus be ascertained directly.

Figure 2:
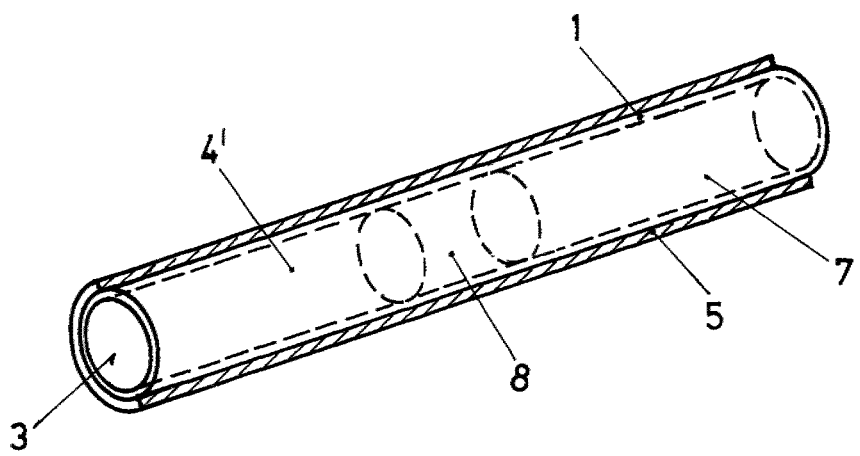
FIG. 2 shows a perspective view of a further exemplary embodiment of a pipetting device according to the invention, which is operated using an operating liquid.

FIG. 2 shows the case where an operating liquid 7 (also called system liquid) is used for pressure transmission. In this case, the tube 1 is partially filled with the operating liquid 7 and partially with the sample liquid 4', wherein an air gap 8 is located between the two, which prevents the operating liquid 7 from coming into contact with the sample liquid 4'. In this case, the operating liquid 7 is also set to the reference potential of the first electrode 5, thus, for example, connected to ground. In the two embodiments according to FIGS. 1 and 2, the electrical contact for the sample liquid 4' can be formed, for example, on the channel wall of the tube 1.

Figure 3:
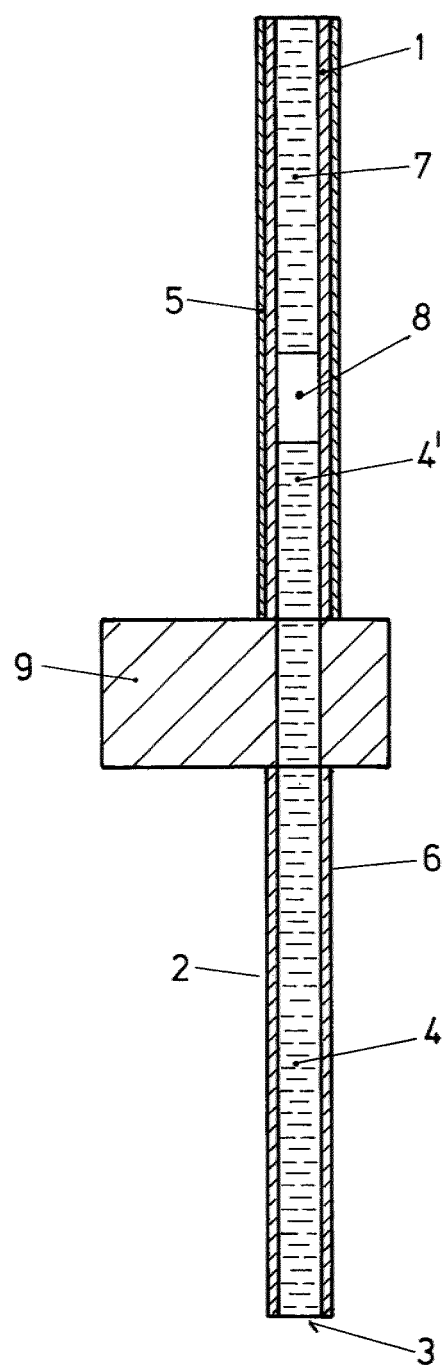
FIG. 3 shows a further schematic illustration of the exemplary embodiment of a pipetting device according to the invention as per FIG. 2.

FIG. 3 shows an arrangement where a pipette tip 2 is attached to the tube 1, wherein the first electrode 5 again envelops the tube 1 and the electrical contact 6 is formed by the pipette tip 2, which consists, for example, of metal or a conductive plastic. The pipette tip 2 can be embodied, for example, as a cannula in this case. In this embodiment of the pipetting device, a measuring unit 9 for ascertaining the capacitance of the measuring capacitor and thus the volume of the sample liquid 4' in the tube 1 is arranged between the tube 1 and the pipette tip 2, so that this unit is integrated directly into the pipetting device. In the embodiment according to FIG. 3, an operating liquid 7 (as shown in FIG. 2) is preferably used.

Figures 4A, 4B:
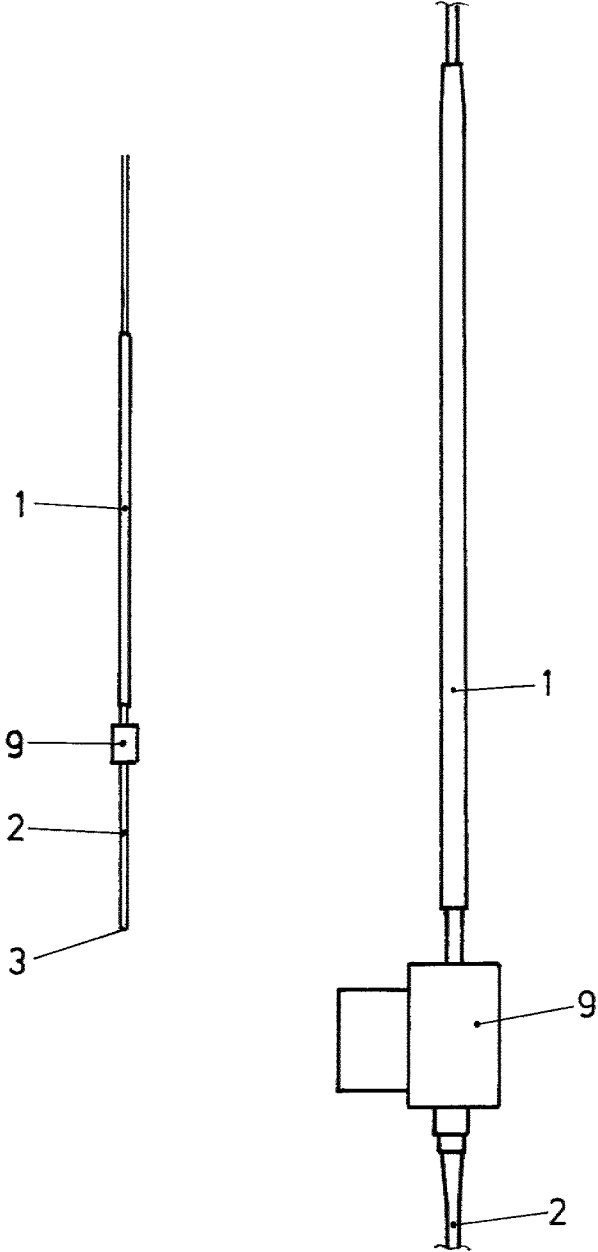
FIG. 4a) shows a perspective view of a further exemplary embodiment of a pipetting device according to the invention, FIG. 4b) shows a detail view of the exemplary embodiment of the pipetting device according to the invention as per FIG. 4a)

FIGS. 4a) & b) show depictions of an experimental setup of a pipetting device according to FIG. 3, which is used to verify the practical functionality of the present invention.

Figure 5:
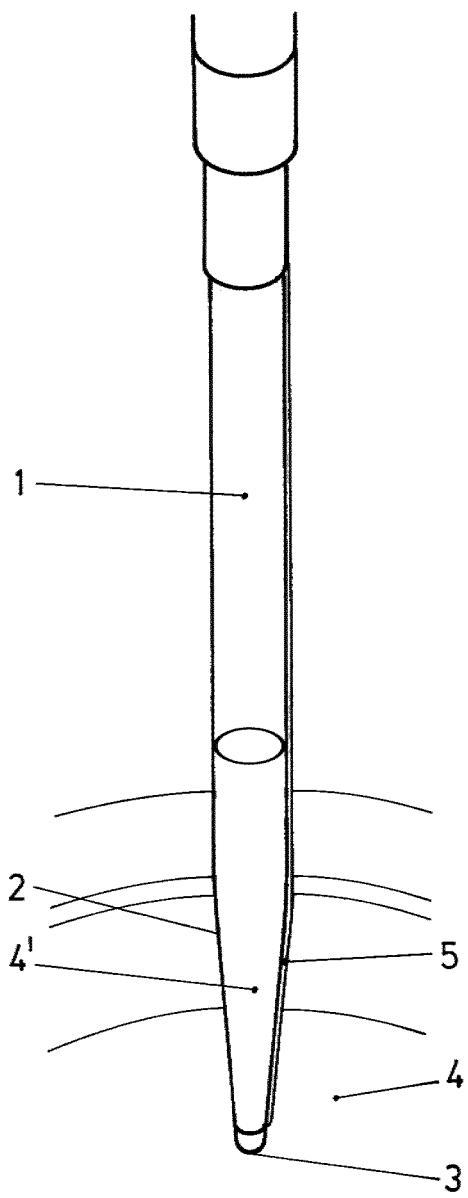
FIG. 5 shows a perspective view of a pipetting tip of an exemplary embodiment of a pipetting device according to the invention.

FIG. 5 shows a further embodiment of the pipetting device according to the invention, wherein the one end is formed as the pipette tip 2 on the tube 1 here. This type of pipette tip 2 is usually manufactured from plastic and is provided for one-time use, i.e., embodied as a disposable tip. In this case, an insulated copper wire, which is arranged along the tube 1 in the longitudinal direction, is used as the first electrode 5. The insulation of the copper wire ensures that upon immersion of the pipette tip 2 into the sample liquid 4, no electrical connection is established with the sample liquid 4. In this embodiment, ground is preferably capacitively coupled to the sample liquid 4 via the bottom of the sample container in which the sample liquid 4 is located. The worktable, on which the sample holder is arranged in a sample holder carrier, is connected for this purpose to ground as the reference potential. The coupling capacitance connected in series is much larger than the measuring capacitance in this case. Alternatively, the sample liquid 4', which forms the second electrode 4', could be connected to the measuring unit, for example, by means of a non-insulated second copper wire, which is used as the electrical contact, or the pipette tip 2 could consist of conductive plastic and form the electrical contact. Instead of a wire, the first electrode 5 could be formed by a suitable coating or envelope of the pipette tip 2. The first electrode 5 could thus be formed by a conductive coating of the outer surface of the pipette tip 2 or by an adhesively-bonded conductive foil. The coating or foil for the first electrode 5 then has to be limited to the region of the pipette tip 2 which is not immersed in the sample liquid 4, or this coating has to be covered with an additional insulation layer in this region.

Figure 6:
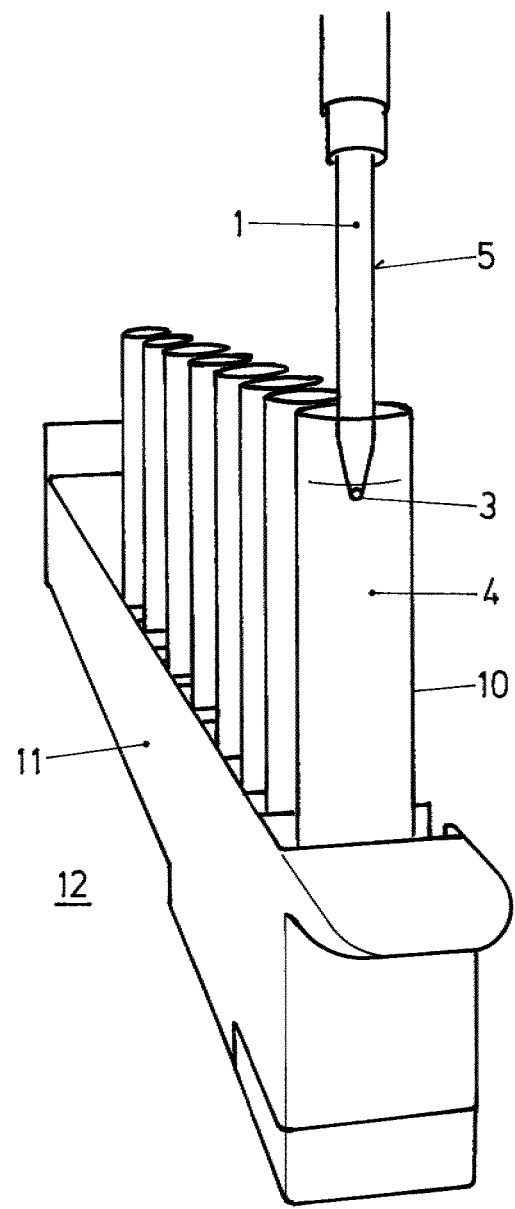
FIG. 6 shows a perspective view of a pipetting tip of a further exemplary embodiment of a pipetting device according to the invention.

FIG. 6 shows a further embodiment of a pipetting device, in which an enveloping copper foil is used as the first electrode 5 on the pipette tip 2. The sample liquid 4 is located in a sample tube 10 as a sample container, which is arranged together with further sample tubes 10 in a sample container carrier 11, which stands on a worktable 12. The conductive worktable surface is connected to ground, wherein the sample liquid 4, which is capacitively coupled to the worktable 12, is also at ground.

Figure 7:
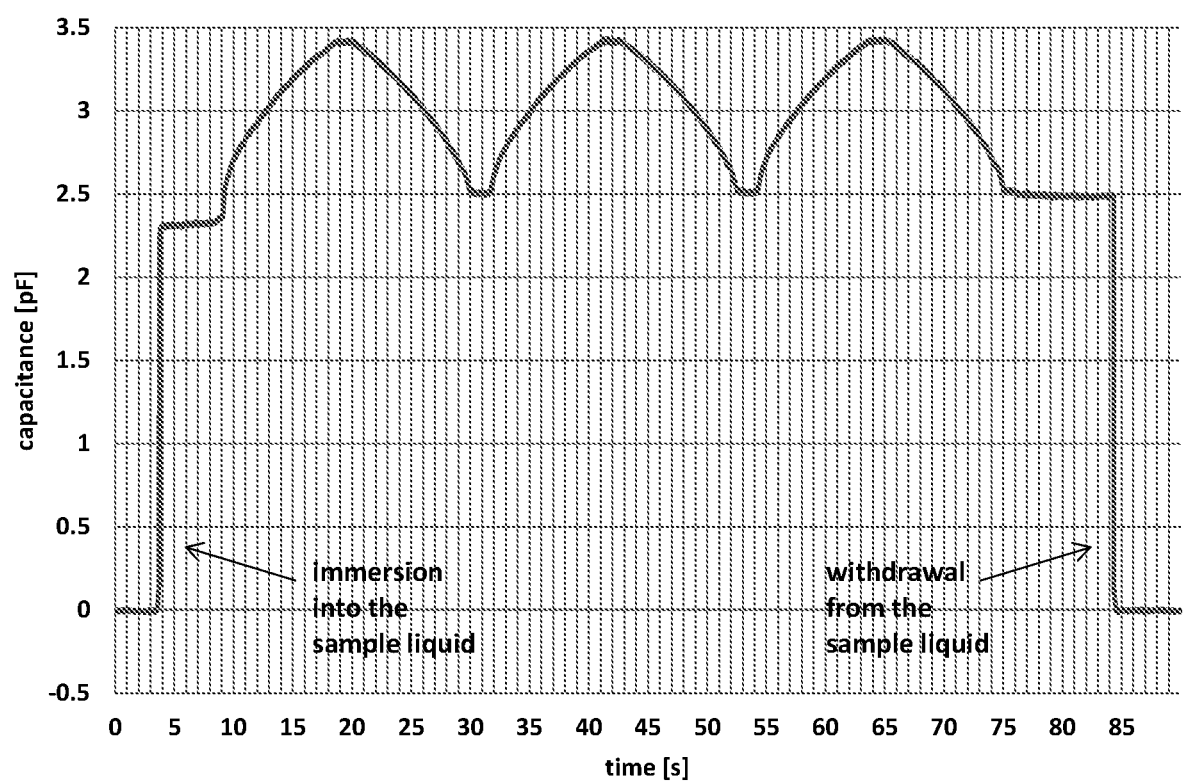
FIG. 7 shows a time curve of the measured capacitance of the measuring capacitor during the aspirating and dispensing three times of a sample liquid by means of a pipetting device according to the invention as per FIG. 6.

FIG. 7 shows the time curve of the measured capacitance of the measuring capacitor during aspirating and dispensing three times of a sample liquid by means of the pipetting device as per FIG. 6. The two capacity jumps upon the immersion of the pipette tip into the sample liquid at the beginning and upon withdrawal at the end can be recognized clearly. Three cycles are located therebetween, during each of which 55 µL of a salt solution as a sample liquid are aspirated and dispensed again at a constant rate of 5 µL/s. The curve shape during the aspirating and dispensing results from the conical geometry of the pipette tip.

LIST OF REFERENCE NUMERALS 1 tube
2 pipette tip
3 opening in the pipette tip, pipetting opening
4 sample liquid in the sample container
4' sample liquid in the tube=second, variable electrode ("liquid electrode") of the measuring capacitor
5 first, fixed electrode of the measuring capacitor
6 electrical contact for the second electrode of the measuring capacitor
7 operating liquid or system liquid
8 air gap
9 measuring unit
10 sample container, for example, sample tube
11 sample container carrier
12 worktable

The invention claimed is:

1. A method for determining a processed liquid volume during pipetting using a pipetting device comprising a tube (1), which has at one end an opening (3) for aspirating or dispensing a sample liquid (4), and which is operationally connectable at the other end to a pressure generating means, wherein a first electrode (5) is formed on the pipetting device which, together with a second electrode (4'), which is formed by at least a part of the sample liquid (4') receivable in the tube (1), forms a measuring capacitor, which is operationally connected to a measuring unit (9), which is designed to determine a volume of the aspirated or dispensed sample liquid (4) as a function of the capacitance of the measuring capacitor, the method comprising the steps of:
determining a first volume of the sample liquid (4') which is located in the pipetting device as a function of the capacitance of the measuring capacitor comprising the first and second electrode (4', 5), wherein the second electrode (4') is formed by a part of the sample liquid (4') which is located in the pipette tip (2) and/or the tube (3);
aspirating or dispensing sample liquid (4) by generating a pressure in the tube (1);
determining a second volume of the sample liquid (4') which is located in the pipetting device at a second point in time as a function of the capacitance of the measuring capacitor comprising the first and second electrode (4', 5), wherein the second electrode (4') is formed by a part of the sample liquid (4') which is located at the second point in time in the pipette tip (2) and/or the tube (1);
determining the liquid volume processed between the first and the second point in time, i.e., the aspirated or dispensed volume of the sample liquid (4'), as the difference between the first and the second volume.

2. The method according to claim 1 wherein the pipetting device comprises an electrical contact (6), which is electrically insulated from the first electrode (5) and is formed such that during aspirating or dispensing of the sample liquid (4), an electrical connection can be established with the sample liquid (4), so that at least a part of the sample liquid (4') which is located in the tube (1) forms the second electrode (4') of the measuring capacitor, wherein the first electrode and the electrical contact for the second electrode (4') are electrically connected to the measuring unit (9).

3. The method according to claim 1, wherein the end having the opening (3) for aspirating or dispensing the sample liquid (4) is embodied as a pipette tip (2), wherein this is integrally formed with the tube (1) or is detachably connected to the tube (1), and wherein the pipette tip (2) in particular is tapered toward the opening (3) or has a conical shape.

4. The method according to claim 1, wherein the first electrode (5) partially or completely envelops the tube (1), in particular the pipette tip (2).

5. The method according to claim 1, wherein the first electrode (5) is formed by a wire, which is arranged along the tube (1) in the longitudinal direction, in particular in the region of the opening (3) or the pipette tip (2).

6. The method according to claim 2, wherein the pipette tip (2) consists of a conductive material and forms the electrical contact (6), or alternatively consists of a nonconductive material, which is used as the dielectric material of the measuring capacitor.

7. The method according to claim 2, wherein the electrical contact (6) is located at the opening (3) of the pipette tip (2).

8. The method according to claim 2, wherein the electrical contact (6) can be established via a capacitive coupling via the sample liquid (4) which is located in a sample container (10), from which sample liquid (4) is aspirated or into which sample liquid (4) is dispensed.

9. The method according to claim 2, wherein the electrical contact (6) is located on a channel wall of the tube (1), in particular it is formed by the channel wall, wherein the channel wall is at least partially coated with an electrically conductive material or consists of an electrically conductive material.

10. The method according to claim 1, wherein the first electrode (5) is covered with an insulation, in particular an electrically insulating layer.

11. A method for aspirating or dispensing of a sample liquid (4) in a liquid processing system comprising a pipetting device and a pressure generating means, wherein the pressure generating means is connected to a controller, the method comprising generating a pressure for the aspirating or dispensing of the sample liquid (4) in a closed control loop based on the volume of the aspirated or dispensed sample liquid (4') determined according to the method of claim 1 by the measuring unit (9) and a predefined target volume of the aspirated or dispensed sample liquid (4').

12. The method according to claim 11, furthermore comprising a motorized transportation unit, for example, a robot arm, on which the pipetting device is arranged, wherein the method further comprises transmitting signals to the transportation unit in order to move the pipette tip (2) of the pipetting device so that the opening (3) of the pipette tip (2) can be accurately positioned, in particular in a liquid container (10) filled with the sample liquid (4), for example, a sample tube (10) or a microplate.

13. The method according to claim 11, wherein a fluid chamber which extends from the pressure generating means up into the tube (1) is filled with an operating liquid (7), which is at the reference potential, in particular is connected to ground.

14. The method according to claim 13, wherein the first electrode (5) is at a reference potential, in particular is connected to ground.

15. The method according to claim 11, wherein the second electrode (4') is at a reference potential, in particular the second electrode (4') is capacitively coupled to ground, for example, via the sample liquid (4), which is located in a sample container (10), from which sample liquid (4) is aspirated or into which sample liquid (4) is dispensed.

16. The method according to claim 1, comprising determining at least one of the following substantive matters based on a time curve in dependence on the determined capacitance and a time curve of the generated pressure:

whether the opening of the pipette tip (3) is at least partially clogged;

whether the sample liquid (4') contains gas bubbles, in particular air bubbles, in particular whether the aspirated or dispensed sample liquid (4') is foamy;

whether air was at least partially aspirated instead of sample liquid (4).

17. The method according to claim 1, comprising ascertaining as a function of the determined capacitance whether an intact air gap (8) is present between an operating liquid (7) and the sample liquid (4') in the tube (1).

* * * * *